United States Patent [19]

Watanabe et al.

[11] Patent Number: 5,059,041
[45] Date of Patent: Oct. 22, 1991

[54] ELECTRICAL INSULATING BEARING

[75] Inventors: Tomoki Watanabe; Yukio Nitta; Kouichi Sato, all of Kokubunji; Yoshiya Fuse; Koji Kinoshita, both of Kobe, all of Japan

[73] Assignees: Railway Technical Research Institute, Tokyo; Bando Chemical Industries, Ltd., Kobe, both of Japan

[21] Appl. No.: 580,289

[22] Filed: Sep. 11, 1990

[30] Foreign Application Priority Data

Sep. 12, 1989 [JP] Japan ................... 1-236384

[51] Int. Cl.$^5$ .................. F16C 19/50; F16C 27/06
[52] U.S. Cl. .................................. 384/476; 384/536
[58] Field of Search ........................... 384/476, 536

[56] References Cited

U.S. PATENT DOCUMENTS

| 3,672,734 | 6/1972 | Bando | 384/536 |
| 3,924,906 | 12/1975 | Kitaoka | 384/476 |
| 4,109,978 | 8/1978 | Ernst et al. | 384/476 X |

FOREIGN PATENT DOCUMENTS

| 54-105408 | 7/1979 | Japan . | |
| 0010111 | 1/1980 | Japan | 384/476 |
| 58-33820 | 3/1983 | Japan . | |
| 59-103023 | 6/1984 | Japan . | |
| 59-173467 | 11/1984 | Japan . | |
| 60-161721 | 10/1985 | Japan . | |

Primary Examiner—Thomas R. Hannon
Attorney, Agent, or Firm—Wenderoth, Lind & Ponack

[57] ABSTRACT

A bearing is provided with a rolling element interposed between an outer ring and an inner ring thereof. The outer ring of the bearing is formed by integrating three elements, a metallic outer ring body having a path of rotation for the rolling elements, an insulating thin film made of a polymer elastic material having an electrical insulating property and covering a portion where the outer ring body is mounted to a housing, and a thin metallic plate provided on an outer surface of the insulating thin film.

4 Claims, 3 Drawing Sheets

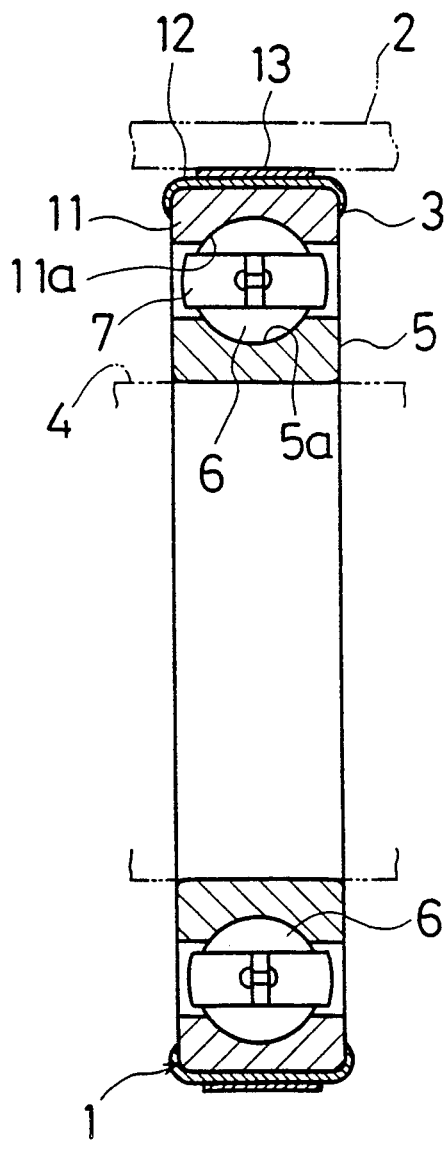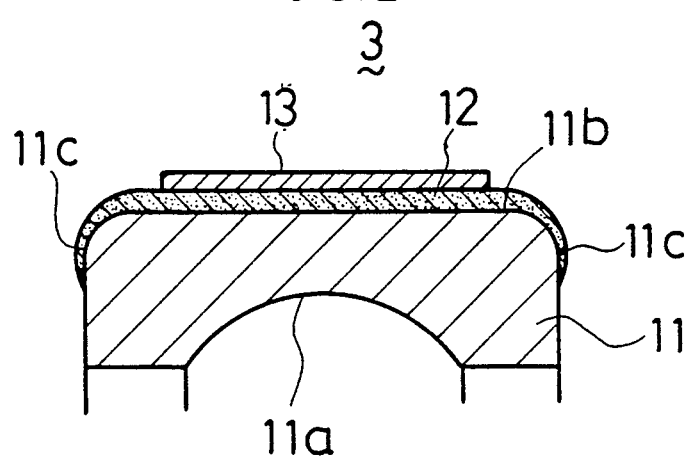

ELECTRICAL INSULATING BEARING

BACKGROUND OF THE INVENTION

1. Field of the Invention

This invention relates to an electrically insulating bearing.

2. Description of the Prior Art

A conventional bearing having a rolling element interposed between an outer ring and an inner ring has been known in the art. In rotary electrical equipment, shaft voltage is usually generated between both ends of a rotary shaft, between the rotary shaft and each bearing, or in sections of the rotary shaft engaging with each bearing. This shaft voltage is generated due to various reasons, such as magnetic unbalance, static storage, direct application of an external power source to the rotary shaft, and an induced electricity generated in the shaft with the use of a rectifier power source. Excessive generation of the shaft voltage causes a shaft current to flow through each bearing portion, resulting in wear in the bearings, damage to the rotary shaft, and blackening of lubricating oil, or in some cases, damage to or scorching of the bearing.

Various approaches have been taken to avoid the above-mentioned problems. For example, Japanese Utility Model Registration Application Laying-open Gazette No. 60-161721 discloses a technique of insulating a bearing with a ceramic layer. In this application, the bearing is treated with a ceramic surface finishing process to form a ceramic layer thereon. Synthetic plastic resin having elasticity and viscosity is then poured into porous portions of the ceramics in order to reinforce the ceramic layer. Japanese Patent Application Laying-open Gazette No. 59-103023 discloses a technique of forming an insulating coating of inorganic compounds with a thermal spraying method. Japanese Patent Application No. 53-80549 discloses a technique of forming an insulating coating with a baking or a coating method. Japanese Utility Model Registration Application Laying-open Gazette No. 59-173467 discloses an insulating technique using a ceramic coating formed by a thermal spraying method.

Various techniques for insulating an axle bearing portion have been known in the art. For example, Japanese Utility Model Registration Application Laying-open Gazette No. 54-105408 discloses a technique of forming an insulating polymer member to cover an outer peripheral surface and a side surface of an outer ring. Japanese Utility Model Registration Application Laying-open Gazette No. 58-33820 discloses a technique of interposing an electrical insulating member between an outer ring and a saddle. In this application, this electrical insulating member is formed in such a manner that a coating member of polymer elastic material is sandwiched between thin metallic plates.

When rotary bearings used in main electric motors for rolling stocks are not electrically insulated, shaft current flows between a main electric motor frame and an armature shaft through a metallic bearing. As a result, the bearing is subject to damage or scorching. The aforementioned prior art techniques attempted to interrupt the shaft current in order to protect the bearing portions in the main electric motors from damage.

Bearings used in main electric motors for rolling stocks are generally installed onto end covers (mounting portions of bearings) of the main electric motors. Accordingly, installation work for installing a bearing on a cover is necessary. In this sense, higher dimensional accuracy is required for the bearings. However, this higher dimensional accuracy cannot be obtained easily when it comes to bearings having insulating members. As a result, the overall dimensional accuracy in installation is lowered when installing these bearings with low dimensional accuracy.

A ceramic-treated bearing has succeeded in improving its dimensional accuracy, but not in overcoming the brittleness of the ceramic itself. In addition, the insulating capacity of the bearing from the cover of the main electric motors can be evaluated only after installation.

In terms of improving the dimensional accuracy, a technique using polymer insulating materials alone is disadvantageous, since it is impossible to raise the dimensional accuracy of the polymer member itself. Furthermore, an insulating material has been made into the form of a thin layer in order to lessen the amount of distortion when a load acts upon the bearing. But this tends to cause damage to the polymer member or ceramic materials upon installation or removal of the bearing.

SUMMARY OF THE INVENTION

It is therefore an object of the invention to provide an electrical insulating bearing which can satisfy the above-mentioned requirements for dimensional accuracy and also for easy and accurate installation, and which can, at the same time, facilitate an evaluation of the insulating capacity.

To achieve the above object, an insulating thin film made of polymer elastic material and a thin metallic plate are used to provide an outer ring itself of the bearing with an electrical insulating property. Accordingly, in this invention, an electrical insulating property of a bearing itself can be evaluated even before installation, and at the same time, the requirement for dimensional accuracy and also for easy and accurate installation can be satisfied.

The particular means devised in this invention to accomplish the above object is to provide an electrical insulating bearing having rolling elements interposed between an outer ring and an inner ring. A metallic outer ring body has a path of rotation for the rolling elements, an insulating thin film made of a polymer elastic material having an electrical insulating property and coating a portion where the outer ring body is mounted to a housing, and a thin metallic plate provided on an outer surface of the insulating thin film, all integrated into a solid one-piece body to form the outer ring.

Since the outer ring is formed by integrating the outer ring body, the insulating thin film and the thin metallic plate, the outer ring itself in the above bearing has an insulating property for electrically insulating the bearing from a housing portion. Accordingly, an electrical resistance between the outer ring body and the thin metallic plate can be measured before installation to the housing to evaluate the insulating property of the bearing.

Thus, it is unnecessary to provide any additional elements between the bearing and the housing in order to electrically insulate the bearing. As a result, installation of the bearing can be facilitated and dimensional accuracy in the bearing portion can be easily improved. Distortion in the insulating thin film due to the load can be kept to a minimum because of the thinness of the film. Therefore, any negative effect on dimensional accuracy can be disregarded. In addition, the dimensions of the outer ring can be adjusted by machining the thin metallic plate. Since the insulating film and metallic plate are thin in thickness, an outer diameter of the outer ring can be similar to those of conventional outer rings. Thus, modifications on part of the housing are not required.

Furthermore, the insulating thin film is made of polymer elastic materials so as to have elasticity and toughness. This means that the insulating thin film has a damping effect against oscillation as a well as resistance against fracture caused by heavy loads during operation. The thin metallic plate protects the insulating thin film from scratches or damage upon installation of the bearing onto the housing, as well as from breakage, due to heavy loads during operation.

To sum up, the outer ring body, the insulating thin film and the thin metallic plate are integrated to make up the outer ring of the bearing in the present invention. As a result, the outer ring of the bearing is provided with an electrical insulating property as well as elasticity or toughness without impairing the dimensional accuracy thereof. The electrical insulating property can be evaluated for each bearing separately before installation. Further, electrical insulation can be accomplished between the bearing and the housing only by installing the bearing onto the housing. Since there is no need to provide any additional electrical insulating member between the bearing and the housing, the installation accuracy of the bearing and the dimensional accuracy of the bearing portion can be improved. Also, the insulating thin film can be protected by the thin metallic plate.

BRIEF DESCRIPTION OF THE DRAWINGS

Further features and advantages of the invention will be apparent from the following description with reference to the accompanying drawings, in which:

FIG. 1 is a sectional view showing a bearing;

FIG. 2 is a sectional view showing an outer ring;

DESCRIPTION OF THE PREFERRED EMBODIMENTS

Figure 3:
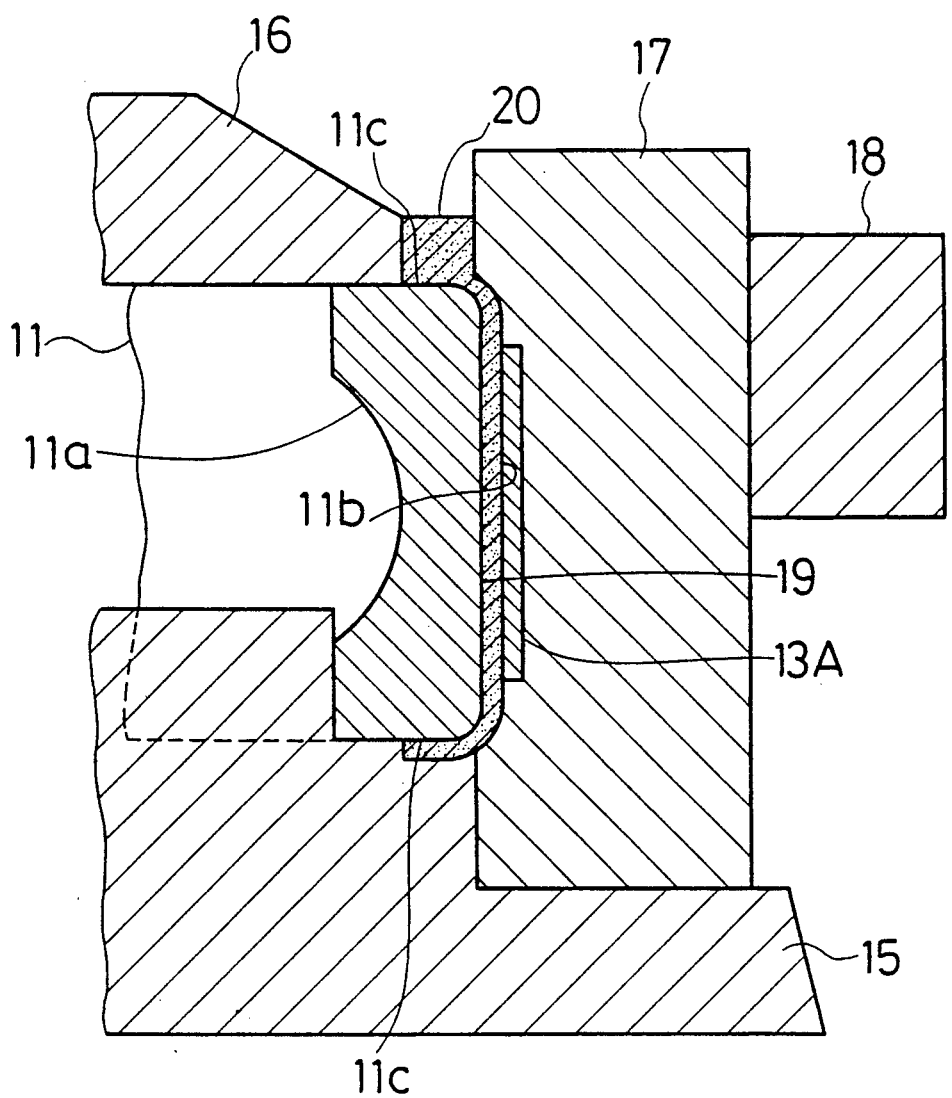
FIG. 3 is a sectional view showing a device for manufacturing the outer ring.

FIG. 1 shows an insulating bearing 1 installed onto an end cover of a main electric motor. This bearing 1 is made up by interposing a plurality of rolling elements (a ball or a roller) 6 between an outer ring 3 and an inner ring 5. The outer ring 3 is fixed onto the cover of the main electric motor (hereinafter called housing 2). An armature shaft 4 is inserted in the inner ring 5.

As shown in the enlarged drawing of FIG. 2, the outer ring 3 is made up by integrating the following three elements into a solid one-piece body: an outer ring body 11; an insulating thin film 12 which covers an outer periphery of the outer ring body 11; and a thin metallic plate 13 which is provided on an outer surface of the insulating thin film 12.

The outer ring body 11 is made of metal, and accordingly has conductivity. The outer ring body 11 has a path 11a for the rolling elements 6 on an inner periphery thereof. The insulating thin film 12 is made of polymer elastic materials. This insulating thin film 12 is provided on a portion extending from an outer peripheral surface 11b to a side surface 11c of the outer ring body 11 so as to electrically insulate the outer ring body 11 from the housing 2. The thin metallic plate 13 is adhered to the insulating thin film 12 on a portion corresponding to the outer peripheral surface 11b of the outer ring body 11. However, the thin metallic plate 13 is provided on the insulating thin film 12 while leaving an exposed portion on the periphery of the insulating thin film 12 so as not to make direct contact with the outer ring body 11.

The desirable thickness and properties of the insulating thin film 12 and the desirable thickness of the thin metallic plate 13 when the outer diameter of the outer ring 3 is approximately 170 mm are as follows.

| insulating thin film | thickness | from 0.1 to 2.0 mm |
|---|---|---|
| | shore hardness | from 80A to 60D |
| | electrical resistance | not less than 100 MΩ |
| thickness of thin metallic plate | | 1.0 mm |

The thickness of the insulating thin film 12 and the thin metallic plate 13 in the above table is shown by the thickness of the superposed portions thereof.

The inner ring 5 has a path 5a for the rolling elements 6 in the outer periphery thereof. Each rolling element 6 is supported by a cage 7. The inner ring 5, rolling element 6, and cage 7 are made of metal, and therefore, have conductivity.

The manufacturing method of the outer ring 3 will now be described.

A metal mold shown in FIG. 3 is utilized in this method of manufacturing the outer ring 3. In FIG. 3, reference numeral 15 designates a lower die wherein the outer ring body 11 is inserted. Reference numeral 16 designates an upper die which covers the outer ring body 11, and reference numeral 17 designates an outer die for positioning a thin metallic plate member 13A onto the outer ring body 11 as well as for forming a cavity 19 for molding the insulating thin film 12 in association with the lower die 15, and reference numeral 18 designates an outer frame for fixing the outer die 17. The outer die 17 is split in the circumferential direction.

The method of manufacturing the outer ring 3 comprises the following steps:

1. Processing the outer peripheral surface 11b and the side surface 11c of the outer ring body 11 (namely portions thereof on which the insulating thin film 12 is coated) with sand blasting treatment. Then, applying adhesives to the outer peripheral surface 11b and the side surface 11c. After drying the outer peripheral surface 11b and the side surface 11c at room temperature, pre-heating them at 50° C. for 120 minutes. To take an example, CHEMLOK #218 manufactured by Hughson Chemicals, Load Co. can be used as adhesives.

2. Pre-heating the lower die 15, upper die 16, outer die 17, and outer frame 18 to 95° C. Then, incorporating the outer ring body 11 and the thin metallic plate member 13A into the mold as shown in FIG. 3.

3. Pouring polymer elastic material 20 into the cavity 19 in the mold.

4. After vulcanizing (mold cure) the polymer elastic material 20 inside the mold for 30 minutes, releasing it from the mold and carrying out re-vulcanization at 110° C. for 24 hours.

5. Installing the rolling element 6 between the inner ring 5 and the outer ring 3 obtained through the above-mentioned process (or by further performing a finishing treatment on the outer surface of the thin metallic plate member 13A with grinding machining if necessary). Thus, the bearing 1 is obtained.

One example of a composition of the polymer elastic material is as follows.

| | |
|---|---|
| PTMEG (polytetramethyleneglycol manufactured by Mitsui-toatsu Co., L-100) | 100 weight part (60° C.) |
| CURAMINE MT (3,3-dichloro-4,4-diaminodiphenylmethane) | 19 weight part (120° C.) |

In this way, the insulating thin film 12 of the outer ring 3 is made of polyurethane. In the bearing of the present invention, therefore, with this insulating thin film 12, the outer ring 3 possesses the capacity of insulating the bearing 1 from the housing 2. As a result, insulation property of the outer ring 3 can be evaluated by measuring electrical resistance between the outer ring body 11 and the thin metallic plate 13 at the time when the production of the outer ring 3 is completed. In this embodiment, the superposed portion of the insulating thin film 12 and the thin metallic plate 13 were 0.5 mm and 1.0 mm, respectively, in thickness, and the electrical resistance was not less than 100 MΩ.

Then the bearing 1 is installed onto the housing 2 and the armature 4. While the bearing 1 is installed on the housing 2 and the armature 4, no discharge occurs from the housing 2 to the armature 4 since not less than 100 MΩ electrical resistance exists in the insulating thin film 12 of the bearing 1. Accordingly, the bearing 1 will never wear excessively. The thin metallic plate 13 is provided inside the peripheral portion of the insulating thin film 12 so as not to make contact with the outer ring body 11. This means that the thin metallic plate 13 does not adversely affect the electrical insulating property of the bearing 1. In addition, with the insulating thin film 12 covering not only the outer peripheral surface 11b but also the side surface 11c of the outer ring body 11, the electrical insulating property can be reliably obtained.

As described earlier, the outer ring 3 has an insulating capacity. Accordingly, when installing the bearing 1, it is not required to insert any additional element between the bearing 1 and the housing 2 in order to form an electrical insulating state therebetween. This will promote easy installation of the bearing 1. Further, dimensional accuracy in the bearing portion (that is, a positional accuracy between the housing 2 and the armature 4 while the bearing 1 is installed on the housing 2) is basically determined by an outside diameter of the bearing 1, namely, an outside diameter of the outer ring 3. This means that a higher dimensional accuracy of the bearing portion can be achieved by adjusting the dimension of the outer ring 3 at the time when the outer ring 3 is produced. When an additional element is necessary, dimensional accuracy of the bearing portion proportionally decreases. In contrast, when an additional element is unnecessary, as in the present invention, dimensional accuracy of the bearing portion increases.

Due to its thinness, the insulating thin film 12 is not easily subject to deformation caused by load during operation. Thus, any effect on the dimensional accuracy because of deformation can be disregarded. More specifically, the insulating thin film 12 is designed to have a thickness of not less than 0.1 mm in the thinnest part thereof in order to acquire the desired electrical insulating property, and as well as a thickness of not more than 2.0 mm on account of the deformation caused by load during operation.

The insulating thin film 12 is designed to have a shore hardness of not less than 80A so as to possess enough strength to withstand the load generated during operation even with a thickness of only 0.1 mm and also to reduce the amount of deformation caused by the load. The insulating thin film 12 is further designed to have a shore hardness of not more than 60D so as to have a damping effect against vibration in the bearing portion. The insulating thin film 12 having a shore hardness of over 60D not only results in loss of the damping effect, but also in a lower toughness thereof, increasing the susceptibility thereof to damage caused by the load during operation.

Since the insulating thin film 12 and the thin metallic plate 13 are thin in their thickness, an outside diameter of the outer ring 3 can be almost similar to that of a conventional ring. Accordingly, no modification is necessary to the housing 2.

The thin metallic plate 13 protects the insulating thin film 12 from damage or scratches when assembling or incorporating the bearing 1 in the housing 2. This plate 13 also protects the insulating thin film 12 from breakage caused by excessive loads during operation while the bearing 1 is incorporated in the housing 2. Therefore, it is desirable that the thin metallic plate 13 has a thickness larger than that of the insulating thin film 12.

Figure 4:
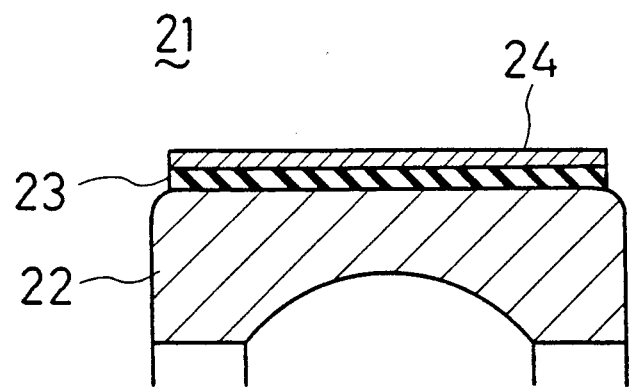
FIGS. 4 and 5 are sectional views showing modified examples of an outer ring.
Figure 5:
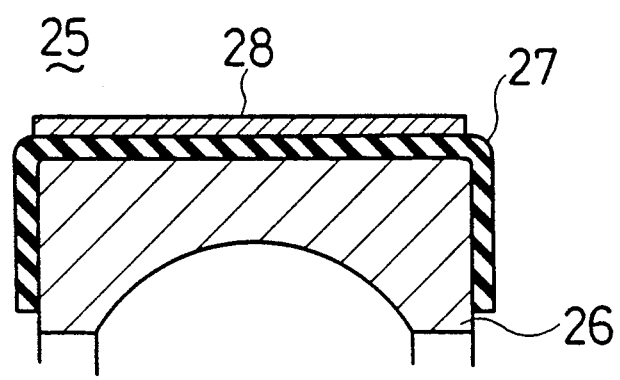

FIGS. 4 and 5 show modified examples of an outer ring.

An outer ring 21 shown in FIG. 4 is provided with an insulating thin film 23 and a thin metallic plate 24, each having an equal width, so as to expose the overall portion of the side surface of an outer ring body 22. On the other hand, an outer ring 25 shown in FIG. 5 exposes an insulating thin film 27 from the both sides of a thin metallic plate 28 so as to cover a side surface of an outer ring body 26 with the insulating thin film 27. Thus, thickness of the insulating thin film 27 is consistent both in an outer peripheral surface and in the side surface of the outer ring body 26.

The modified example illustrated in FIG. 5 is provided with the insulating thin film and the thin metallic plate formed only in a portion where the outer ring body is incorporated in the housing. As in this example, the insulating thin film and the thin metallic plate in the other aforementioned examples of the invention can be formed only in a portion where the outer ring body is incorporated to the housing.

The aforementioned examples apply to a rotary bearing of a main electric motor for railroad vehicles. However, it is to be understood that the present invention can be applicable to bearings of various equipment (for example, electrical welding equipment, etc.) or, further, to chassis bearings for vehicles.

As many apparently widely different embodiments of this invention may be made without departing from the spirit and scope thereof, it is obvious that the invention is not limited to the specific embodiments thereof except as defined in the appended claims.

What is claimed is:

1. An electrically insulating bearing having an outer ring, an inner ring and a plurality of roller elements therebetween, said outer ring comprising:

a metallic outer ring body made of a conductive material and having a path for said rolling elements and an outer surface;

an insulating thin film made of an elastic polymer material having electrical insulation properties, said insulating thin film covering said outer surface of said outer ring body; and a thin metallic plate made of an electrically conductive material, said thin metallic plate being disposed on said insulating thin film, having a width narrower than the width of said insulating thin film so as to expose side portions of said insulating thin film on opposite sides of said thin metallic plate, and having a fixed outer diameter such that said outer ring has a fixed outer diameter.

2. The electrically insulating bearing of claim 1, wherein:

said outer surface of said outer ring has a main surface portion and side surface portions;

said insulating thin film covers said main surface portion and at least parts of said side surface portions; and said thin metallic plate covers said insulating thin film only on the portion thereof covering said main surface portion.

3. The electrically insulating bearing of claim 1, wherein said metallic outer ring body, said insulating thin film and said thin metallic plate are integrally formed.

4. The electrically insulating bearing of claim 1, wherein said insulating thin film is 0.1 to 2.0 mm in thickness and said thin metallic plate is 1.0 mm in thickness.

* * * * *